Figure 5:
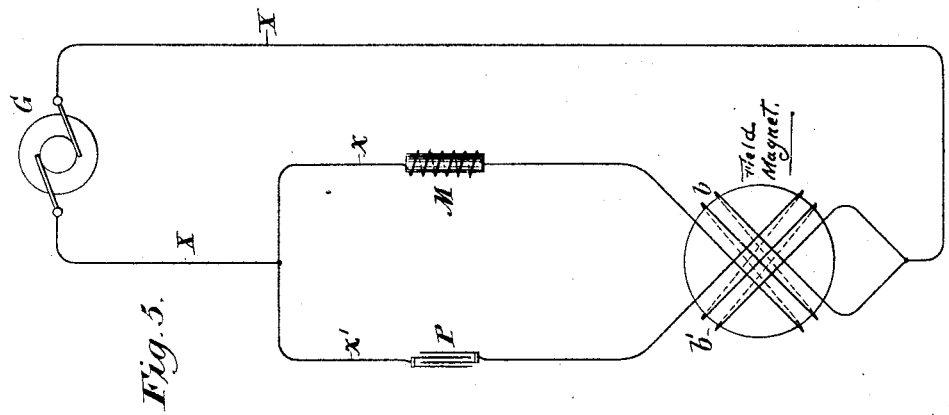

(No Model.) 3 Sheets—Sheet 1.
E. ARNOLD.
ALTERNATING CURRENT MOTOR.
No. 538,648. Patented May 7, 1895.
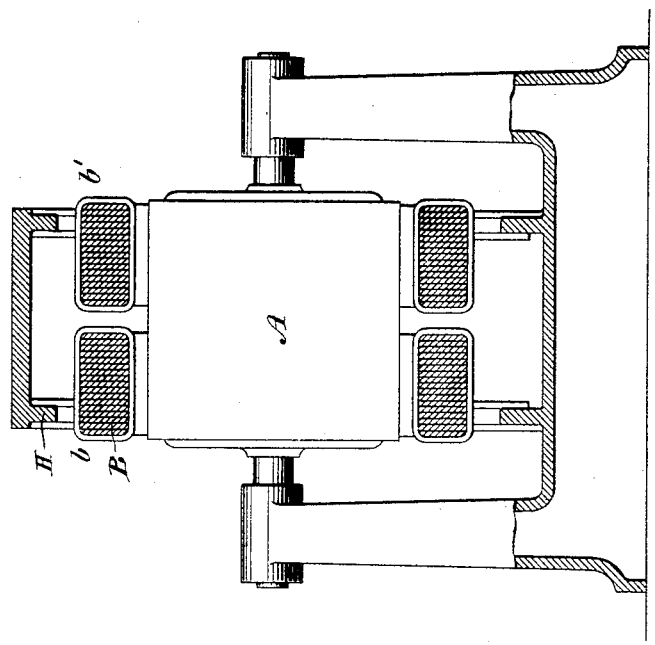
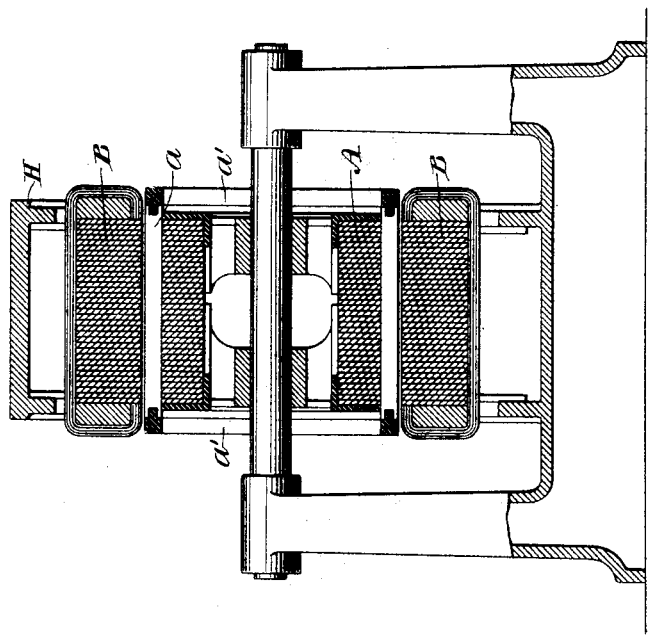
Witnesses
Edward Thorpe
George N. Sonneborn
Inventor
Engelbert Arnold
By his Attorney
Harold Binney (No Model.)  3 Sheets—Sheet 2.
E. ARNOLD.
ALTERNATING CURRENT MOTOR.
No. 538,648. Patented May 7, 1895.
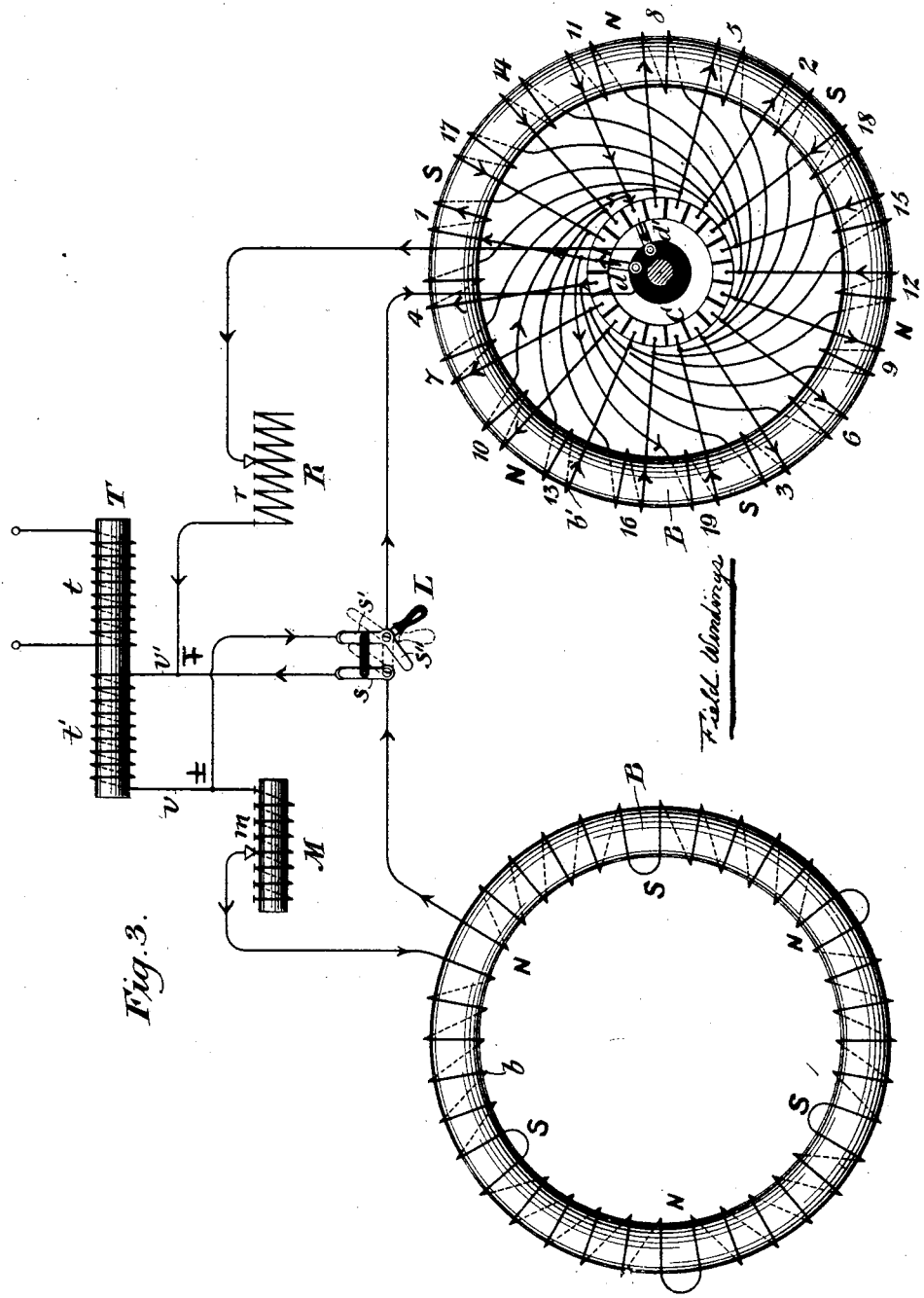
Witnesses
Edward Thorpe
George H. Sonneborn
Inventor
Engelbert Arnold
By his Attorney (No Model.) 3 Sheets—Sheet 3.
E. ARNOLD.
ALTERNATING CURRENT MOTOR.

No. 538,648. Patented May 7, 1895.

Witnesses
Edward Thorpe
George N. Sonneborn

Inventor
Engelbert Arnold
By his Attorney
Harold Binney

UNITED STATES PATENT OFFICE.

ENGELBERT ARNOLD, OF ZURICH, SWITZERLAND.

ALTERNATING-CURRENT MOTOR.

SPECIFICATION forming part of Letters Patent No. 538,648, dated May 7, 1895.

Application filed July 10, 1894. Serial No. 517,094. (No model.)

*To all whom it may concern:*

Be it known that I, ENGELBERT ARNOLD, a citizen of the Swiss Republic, residing at Zurich, Switzerland, have invented a certain new and useful Improvement in Motors for Alternating and Similar Currents and in Methods for Starting and Operating Such Motors, of which the following is a description, referring to the accompanying drawings, which form a part of this specification.

My invention is applicable to motors operated by alternating, pulsatory, intermittent, or other forms of current capable of producing similar inductive effects; but is particularly applicable to motors operated by single-phase alternating currents. By the term "alternating current" as used in this description, however, I mean to include all such intermittent, pulsatory or undulatory currents, as may be used to produce similar electro-magnetic inductive effects,—regarding such currents for this specification, as substantial equivalents of a true alternating current. Under my invention the armature may be of the short-circuited type or may be supplied with currents from the same source of energy, or from other sources. Continuous currents may of course be employed in the armature if it is desired to permanently magnetize it so that it may revolve synchronously in the rotating field produced by the alternating currents in the field circuits. My invention lies mainly in the arrangement and control of the field magnet circuits by which I am enabled to employ single phase alternating currents to start and operate electric motors; without the objectionable waste of energy and the inconvenience usually attending the starting of single-phase motors. Single phase alternating current motors, as is well understood, are not capable of self-starting without special provision, because the inductive effects of an alternating current will produce only magnetic reversals of the field without any rotary effect whatever. The armature windings, being short-circuited, act as the closed secondary coils of a transformer producing great current and heating effect without any torque. To overcome these difficulties and to give initial rotation to the armature, many devices have been employed, some operating by unbalancing the magnetic field, or by commutating the induced currents in the armature, and others operating on the Ferraris and Tesla principle by means of a local secondary or branch circuit carrying currents differing by a quarter phase, approximately, from those in the primary or other branch. In some instances the currents in one of these two circuits is discontinued when the motor has been started. In other instances both circuits are used even when the motor is running at its proper speed.

In the present invention I have devised a way of starting and operating motors by which I effect an initial rotation of the magnetic field and consequent starting of the armature, and when speed has been attained I change the connections in such a manner that the motor operates as a single-phase alternating current motor. At starting I supply an alternating current to the field magnets in a manner to produce poles at certain points, and I supply an alternating current of a different phase to the field magnets in a manner to produce a second series of magnetic poles at an angle or at a different angular position to those of the other currents. In this manner a successive shifting of the magnetic field takes place in a manner well understood. This shifting or rotation of the field causes the armature to rotate and acquire speed.

The armature may carry short-circuited windings, or may be connected in circuit by means of a commutator or in any other well known mannner.

When sufficient speed has been attained, I change the field connections of one of the two field circuits until the poles produced by both the field currents correspond, and I bring the phases of the two currents into synchronism either by changing the induction of one of the circuits, or by connecting the windings supplying the two currents in series. When this change of connections and phases has been effected, the field magnet is supplied with a single phase alternating current connected in a manner to produce poles at desired points, and the motor operates as a single phase induction motor, the reciprocal action between the armature and the field causing the alternating current to produce a rotary magnetic effect in the well known manner.

The construction of my motor and arrangement of circuits may be varied in several ways, all carrying out the method I have described.

The connections to the field for the two currents of differing phases may be made in a single continuous field winding. Preferably, however, there will be two distinct windings for the currents. The connections to one of these sets of windings may terminate in commutator plates and the current be supplied through commutator brushes which are adjustable relatively to the commutator segments to shift or alter the position of the poles produced by the corresponding windings. Both the sets of field magnet windings may be supplied from a single source of alternating current, means being provided for advancing or retarding the phases of the current in one or the other field circuit and in this way effecting the difference in phases. The field magnets also may be made in many different ways, and there may be a single core for both sets of windings or there may be two separate cores, one for each.

Where short-circuited armature windings are employed it is preferable to sub-divide them and close some of them through a resistance while starting; and then, as speed is attained, successively close the circuits of the other coils. In this manner less current is generated in the armature and heating and waste largely prevented. Where the field magnets are stationary and the armature revolves it is not always convenient to make such armature connection, but where the field magnets rotate and the armature is stationary the opening and closing of the armature coils may be readily effected by a series of stationary switches.

Such briefly is a general view of my improvement in the method and in the construction for starting and operating alternating current motors.

The details both of the method and apparatus will be better understood from reference to the accompanying drawings, which show one preferred embodiment of my invention and certain modifications.

Figure 4:
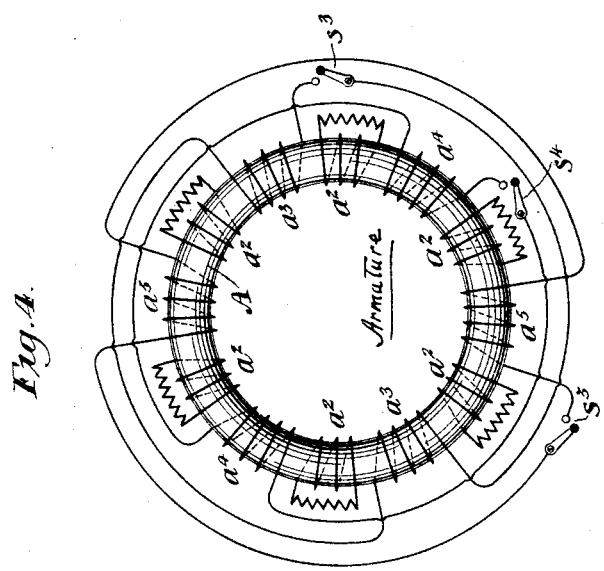

Figure 1 is a longitudinal cross-section of one of my preferred types of motor, showing the form of the field-magnet and armature-cores and some of the windings. The electric connections and switches are omitted from this figure. Fig. 2 is a similar view showing a modification of the form of field-magnet cores. Fig. 3 is a diagrammatic illustration of the winding and connections of the field-magnets. Fig. 4 is a diagrammatic illustration of the armature-windings for a short-circuited armature, particularly applicable to stationary armatures used with rotary field-magnets; and Fig. 5 is a diagrammatic illustration of the outside circuit-connections and one means for producing quarter-phase currents.

Throughout the drawings like letters of reference indicate like parts.

Referring to Figs. 1 and 2, the armature is shown at A, the field cores at B, and the housing or stationary frame of the machine at H. In Fig. 1, the field magnet core is of the ring type with inward projecting pole pieces. In Fig. 2, the field core is formed of two parallel rings carrying the respective field coils $b$ and $b'$, the latter being commutated, to change the position of the poles produced by it, in accordance with my invention. In Fig. 1, the armature windings are shown of the permanently closed circuit type, the parallel conductors or bars $a$ terminating in the connecting rings $a'$ at each end.

The field windings and circuit connections are diagrammatically set forth in Fig. 3. The field cores are indicated as above by B. For convenience of illustration I have shown two separate field cores, as in Fig. 2, but the two sets of windings may of course be mounted on a single core as in Fig. 1. The field current is supplied from the transformer T, primary coils from the main circuit being shown at $t$ and the secondary coils at $t'$. To the secondary coils $t'$ the two field windings $b, b'$ are connected in shunt. Current from the terminal $v$ flows through the inductive resistance M, coils $b$, switch $s$ and back to the other terminal $v'$ of the transformer. Current also flows from the terminal $v$ through the switch $s'$, brush $d$, thence through the series-connecting field windings $b'$, by brush $d'$, resistance R, to terminal $v'$. The inductive resistance M and the ohmic resistance R cause a difference of phase between the two branches of the circuit from the secondary coils of the transformer. The phases in the branch containing the inductive resistance will of course lag behind those containing the ohmic resistance. The poles produced by the coils $b$ for one impulse of the current are indicated by the letters N and S respectively. Those produced by the winding $b'$ are indicated in the same way. This winding $b'$ is what I term my series connection field winding. I have shown nineteen coils and nineteen commutator plates C. I have numbered the coils 1 to 19 respectively, so that the circuits may be readily traced out. Each terminal of each coil is connected with the terminal of the coil sixth from it, that is to say, separated by five coils. Coils therefore connected in series produce currents in the same direction at the three points of the core approximately one hundred and twenty degrees apart; and by placing the brushes upon commutator segments separated from each other by two segments, six poles may be produced in the magnet as indicated by the letters N and S respectively. The brushes may be shifted to alter the position of these poles. At starting, the poles should be about midway between the poles produced by the other winding $b$ and the currents in the two windings should differ by a quarter of a phase. If the currents differ by less, the angular difference between the poles produced by the two windings should be proportionately less.

In practice the proper position will be the one in which the greatest torque is produced with a minimum current. As the armature acquires speed, the inductive resistance M may be reduced by means of the sliding contact $m$ and the retardation of the phases in the winding $b$ thereby decreased. At the same time the resistance R may be cut out by the sliding contact $r$ until the phases in the circuits $b'$ correspond with those in the circuit $b$. This gradual reduction of the difference in the phase may be effected simultaneously with a shifting of the brushes $d$, causing the poles produced by the two sets of connections and windings to correspond at the instant the phases correspond. When this has been done the motor is virtually operated by single-alternating current of single-phase. The field windings $b$ and $b'$ may then be thrown in series by means of the switch lever L breaking the circuits of the switches $s$ and $s'$ and closing the switch $s''$. The series connection will then be as follows:—from terminal $v$ through contact $m$ (with or without any inductive resistance M), field winding $b$, switch $s''$, brush $d$, winding $b'$, brush $d'$, contact $r$, (preferably with no ohmic resistance R) back to the other terminal $v'$ of the secondary coils $t$ of the transformer T. Either the ohmic or the inductive resistance may be omitted; and the correspondence of the two phases may be produced solely by means of the switch which connects them in series. In the latter case, field windings $b'$ are preferably commutated to correspond to the winding $b$ before the switch $s''$ is closed.

The form of series connection and commutator for the field windings $b'$ is of course only one way of carrying out my invention.

In an application filed by me of even date herewith, I have described and illustrated a form of commutating device which may be used in one of its modifications with advantage to effect this commutation. As I have claimed this device broadly in the other application, as a stationary "distributer" for the field magnet circuits, I will not describe its details in this patent.

When the brushes $d\ d'$ so commutate the windings $b'$ that the poles produced correspond with the poles of the windings $b$, no rotary magnetic effect is produced with the armature stationary. If the brushes are shifted slightly in one direction, a corresponding rotary effect will be produced, and if the brushes are shifted in the opposite way, rotation in the opposite direction will follow. Therefore my commutator field windings enable me to start the armature at will in either direction. Where for any reason it is desired to have the field magnets rotate and the armature stationary, connections must of course be made to the field magnet by contact rings and sliding brushes; but as these are matters well understood in the art, I will not attempt to set them forth at length. Where such rotary magnets are used for the stationary armature, the short-circuited windings on the armature may be conveniently arranged according to my invention in the manner indicated in Fig. 4. At $a^2$ are shown coils permanently short-circuited through a resistance. At starting, sufficient current is generated in these coils by the rapid rotation of the field, to produce the necessary torque. As the motor acquires speed the inductive effect diminishes and the circuit of the open coils $a^3$ is closed by the switch $s$. As synchronism is more nearly approached, the coils $a^4$ and $a^5$ may be successively closed by the switches $s^4$ and $s^5$. The field magnet circuits may be commutated and connected in series as above. Of course, where the armature rotates, the connections to switches are more difficult, and in some instances it is not necessary or advisable to make such provision, the waste of current in motors that are only stopped and started at comparatively rare intervals being inconsiderable.

In Fig. 5, I have shown another means for producing the difference in phase in the two field magnet windings. The windings are indicated as above by $b$ and $b'$. These are connected in the two branches $x\ x'$ of an external circuit X from a generator, or other source of alternating current G. In one branch, as $x$, I include an inductive resistance M which tends to cause a retardation or lag of the phases in that branch, and in the other branch, as $x'$, I include a condenser P, which, as is well known, if of proper capacity, will neutralize the self-induction of the circuit. I make no claim, however, to this well known means of causing the differences of phase in my invention, as any other means may be employed which is capable of producing the same result.

I have now set forth my method of starting and operating electric motors, and the means by which I employ two currents of differing phase to form two sets of field magnet poles at different angular positions, and thereafter cause the phase and the angular positions to correspond, and the means by which I carry into effect the minor improvements which form part of my invention.

I have purposely omitted the enumeration of many modifications and the description of the several details that may be supplied by mere skill in the art, because to set these forth at length would obscure rather than make clear the more essential features of my invention.

I claim, however, and desire to secure by these Letters Patent of the United States, together with all such modifications and variations as may be made by mere skill in the art, and with only the alterations and restrictions expressed or implied, the following:

1. The method of starting and operating motors for alternating and similar currents: by supplying current to the field coils in a manner to produce poles at certain fixed points, and current of different phase in a manner to produce poles at an angle with the first said poles, thereby producing a rotary field, and thereafter diminishing the said angle by commutating or changing the field connections and diminishing the difference of phase, substantially as and for the purposes set forth.

2. In combination with a source or sources of alternating or similar currents, two sets of field windings therefor, two sets of field connections each arranged to produce poles at an angle with the poles of the other set, means for commutating or changing the electrical connections and thereby altering the angular position of the poles produced by one such set of field connections, means for varying the current phases in the two sets of field windings, and an armature inductively operated thereby, substantially as and for the purposes set forth.

3. In combination with a source or sources of alternating or similar currents, an armature, a field magnet core and field windings thereon, two sets of field connections from the said source or sources of current, means for altering the said connections and thereby the angular positions of the poles produced by one of the said sets of field connections, and means for advancing or retarding the current phases in one of the said sets of connections, whereby rotation of the field may be produced at starting, and the motor thereafter be operated as a single-phase motor, substantially as and for the purposes set forth.

4. In a combination in an electric motor, an armature, field windings, a set of field connections for producing poles at fixed points, a second set of field connections, and a commutator therefor for altering the angular position of the poles produced by the said second set, substantially as and for the purposes set forth.

5. In combination in an electric motor, an armature, field windings, a set of field connections for producing poles at fixed points of the said windings, a second set of field connections, a commutator therefor for controlling the position of the poles produced by the said second set of field connections, and means for advancing or retarding the phases of an alternating current in one or both the said sets of field connections, substantially as and for the purposes set forth.

6. In an armature for alternating and similar current motors, one or more armature coils short-circuited either directly or through a resistance, one or more open armature coils, and a switch or switches for closing said open coils, at will, substantially as and for the purposes set forth.

In testimony whereof I have hereunto set my hand, at the city of Zurich, Switzerland, in the presence of two subscribing witnesses, this 23d day of May, A. D. 1894.

ENGELBERT ARNOLD.

Witnesses:
HELENE ARNOLD,
H. CABHARTZ.